March 8, 1938.  J. W. ALBIN  2,110,435
LATCHING DEVICE
Filed May 26, 1937  2 Sheets-Sheet 1
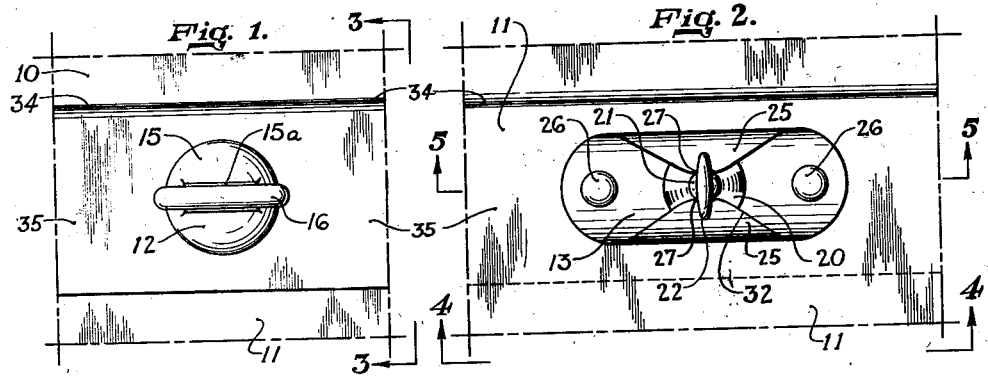
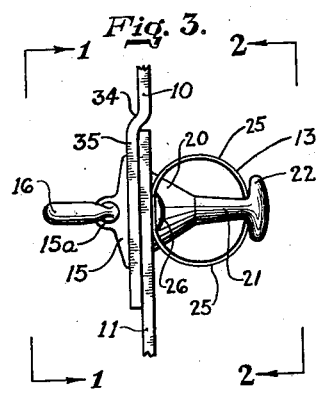
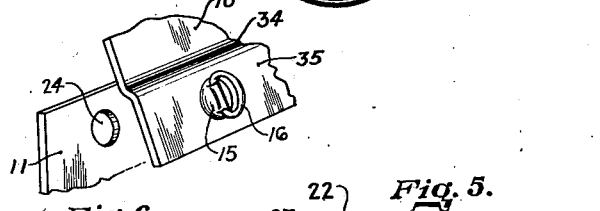
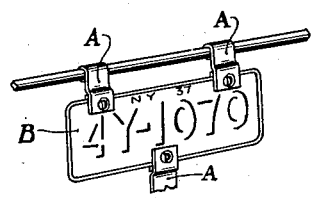
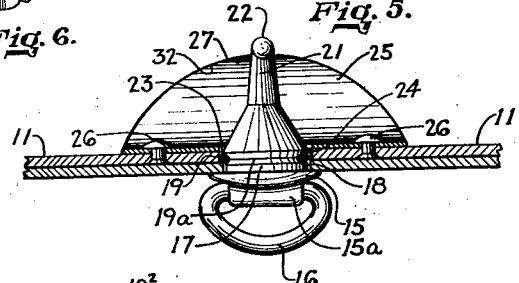
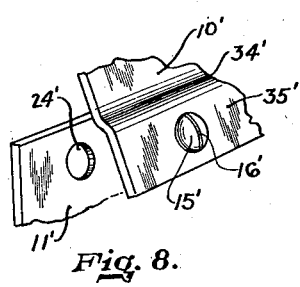
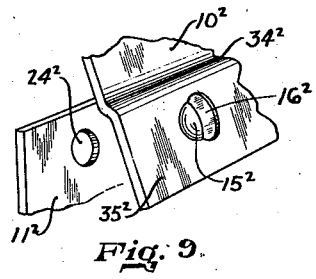
INVENTOR
JEREMIAH W. ALBIN
BY Richards & Geier
ATTORNEYS March 8, 1938.    J. W. ALBIN    2,110,435
LATCHING DEVICE
Filed May 26, 1937    2 Sheets-Sheet 2
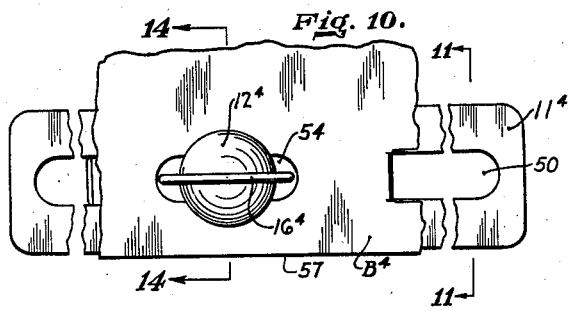
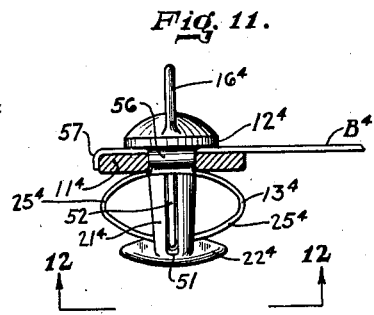
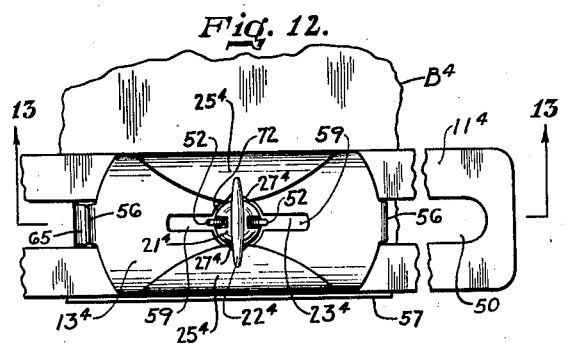
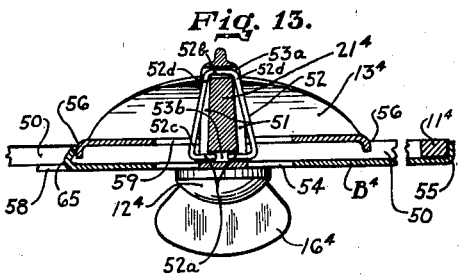
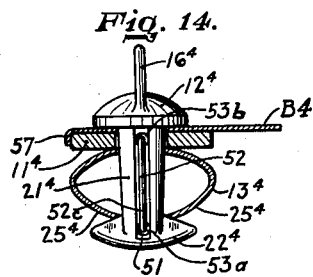
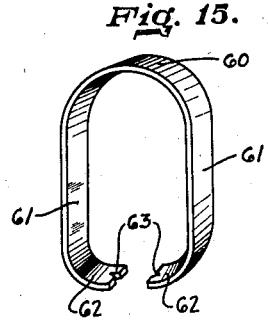
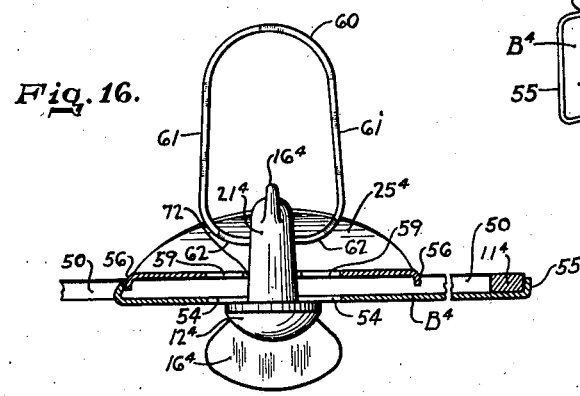
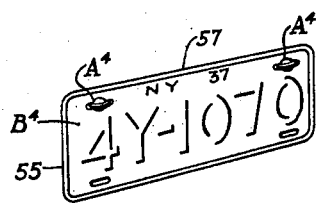
INVENTOR
JEREMIAH W. ALBIN
BY
Richards & Geier
ATTORNEYS Patented Mar. 8, 1938

2,110,435

UNITED STATES PATENT OFFICE 2,110,435

LATCHING DEVICE

Jeremiah W. Albin, Babylon, N. Y.

Application May 26, 1937, Serial No. 144,808

6 Claims. (Cl. 40—125)

The present invention relates to a latching construction which may be generally applied to attaching or latching sheet metal doors, cowls, covers, hoods, and so forth, to mounting structures or to mounting structures for automobile plates and so forth.

Although not specifically restricted thereto, the present invention may be particularly described in connection with its application to a license plate or hood latching devices upon automobiles, stream-line trains, or airplanes in which a cover of sheet metal is to be firmly attached or latched to a mounting structure.

It is among the objects of the present invention to provide a simple latching construction of the character described which will be of inexpensive construction, may be readily operated to make a rigid connection which will not permit of rattling and which may be utilized for long periods of time without damage and without breakage.

Other objects will be obvious or will be apparent during the course of the following specification.

In accomplishing the above objects, according to one embodiment of the present invention, it has been found most suitable to provide a key member having a cam end structure.

This key is pivotally mounted upon one of the elements to be locked together, while the other element is provided with an opening to receive said cam structure and with a curved plate latching means therefor.

Preferably, said plate should firmly hold said key in position when the same has been inserted through the opening and turned.

In the drawings are shown one preferred embodiment of the present invention, to which, however, the invention is by no means limited. This embodiment is shown merely by way of illustration and not by way of limitation.

The above and other objects will appear more clearly from the following detailed description when taken in connection with the accompanying drawings which will illustrate a preferred embodiment of the inventive idea.

Referring to the drawings:

Figure 1 is a front view of the locking device of the present invention upon the line 1—1 of Figure 3.

Figure 2 is a rear view of the combination of Figure 1 upon the line 2—2 of Figure 3;

Figure 3 is a side view upon the line 3—3 of Figure 1.

Figure 4 is a bottom view upon the line 4—4 of Figure 2;

Figure 5 is a longitudinal section view upon the line 5—5 of Figure 2;

Figure 6 is a perspective view showing fragments of the two plates to be latched together respectively carrying the key and receptor just before the key is inserted into position;

Figure 7 shows the device of the present invention applied to an automobile license plate holder;

Figures 8 and 9 show alternative actuating constructions for the key of the device.

In Figures 10 to 17 are shown an alternative embodiment, particularly designed for the attachment of license plates to automobiles and vehicles; Figure 10 being a front fragmentary view showing a portion of the license plate, a rear bracket and the locking or latching device; Figure 11 being a transverse sectional view upon line 11—11 of Figure 10; Figure 12 being a rear view upon the line 12—12 of Figure 11; Figure 13 being a longitudinal sectional view upon the line 13—13 of Figure 12; Figure 14 being a vertical sectional view upon the line 14—14 of Figure 10; Figure 15 being a perspective view of the disengaging tool; Figure 16 being a side sectional view similar to Figure 13; showing the manner in which the tool of Figure 15 may be utilized and Figure 17 being a perspective view showing the manner in which the connection of Figures 10 to 14 may be utilized to hold the license plate in position.

Referring to Figures 1 to 4, the plate 10 and the plate 11 may take any desired form and may be extensions or portions of the hood, casing or cover of an automobile or a sheet metal door or cover on an airplane or train or part of a mounting structure.

The front plate 10 carries the key structure 12, while the rear plate 11 carries the latch 13.

The key structure consists of an outer conical element 15 having an opening or sleeve 15a receiving a ring 16 serving as a manipulating member. The key has a shank 17 which extends through an opening 18, said key being held in position by the spring or snap ring 19 attached to said shank on the other side of said opening 18 and fitting in the groove 19a.

Beyond the ring 19 the shank has a continuation or conical stem 20 which is continued in another conical portion 21 terminating in the cross element 22 with pointed and rounded ends.

The resilient latch 13 consists of a curled plate 25 which is riveted at 26 to the rear plate 11, the opposite sides of turned in edges 32 being provided with recesses 27 into which the ends of the cross element 22 are designed to snap in the manner best indicated in Figures 2 and 3.

The recesses 23 in the plate 25 and 24 in the plate 11 are of sufficient size to receive the key extensions 20 and 21.

In operation, the locking device may be locked into the position shown in Figures 1 to 5 by placing the key 12 when the element 10 is unlatched from element 11 ninety degrees from its position shown and then inserting the conical portions 20 and 21 into the openings 23 and 24.

At this time the end 22 will be positioned parallelly of the curled plate element 13 and upon being turned ninety degrees in either direction, the ends of the element 22 will ride over and depress the edges 32 of the plate 25 and finally snap into the recesses 27 where a firm and rigid lock will be obtained.

It will be noted that the outside plate 10 is offset at 34 so that its offset portion 35 may lie in the front of the plate 10 and permit the outside portions of two plates 10 and 11 to be flush with each other, this being best shown in Figure 3.

In Figure 7 is shown how three latching devices indicated at A of the construction disclosed in Figures 1 to 6, may be utilized to lock a license plate B in position.

In Figures 8 and 9 are shown alternative key-head constructions, the head 15' of Figure 8 being provided with a fillister slot 16' to receive a screw-driver and the head 15² of Figure 9 having an outstanding fin 16² to be grasped and turned by the fingers.

It is thus apparent that the present application has provided a simple, inexpensive and readily manipulated locking device of general application to automobile constructions or to other uses and which is of particular value in places where a durable, inexpensive and strong locking construction is desired.

It will be noted that the key element 12 may be turned in either direction to lock the device and that the resiliency of the plate 25 together with the snapping of the element 22 into the recesses 27 will give a firm connection which will not tend to loosen with rattling or shaking of the device to which the lock is applied.

In the embodiment of Figures 10 to 14 is shown a construction which is adapted automatically to lock itself in position and which is particularly designed for the connection of license plates to supporting frames in such a manner that they may not be readily removed.

It is to be understood, however, that although the attachment of license plates is one preferred field of application, the locking device of Figures 10 to 14 may be widely used in other connections to form a self locking latch arrangement.

In the construction of Figures 10 to 14, similarly functioning parts are indicated by the same numerals provided with a superior 4 as they are referred to in the construction of Figures 1 to 9.

In Figures 10 to 14, the bar 11⁴, which may be permanently attached to the frame work of the car or be an actual structural part of the body, is provided with a slot 50. If desired, instead of forming the slot 50 in the bar 11⁴, it may be formed directly in the body or frame structure of the automobile or other vehicle which is designed to carry the license plate.

The resilient curled locking plate 13⁴ is not attached to the element 11⁴, but is an independent device and is locked in position by the key element 12⁴. The downturned flanges or tangs 56 at its base fit into the slot 50 in the bar 11⁴. The key element is provided with a single conical shank 21⁴, the sides of which are slotted as indicated at 51 to receive the spring member or members 52 which normally are pressed outwardly at their upper portions 52c removed from the end 22⁴ beyond the sides of the shank 21⁴, as best shown in Figures 12 and 13. The elements 52 may be formed of a single oblong shaped wire split at one side and extending through the openings 53a and 53b in the bottom of the slots 51 (see Figures 13 and 14).

The split ends 52a of the wire 52 are pressed into the hole 53a while the continuous intermediate portion 52b of the wire extends through the hole 53b.

The portions 52c will extend beyond the slots 51 but the inside portions 52d will remain within said slots. The license plate B⁴ is provided with the usual openings 54 and is also provided with the inturned edges 55 and 57. It is also provided with the inturned tangs 65 which cooperate with the inturned end flanges 56 at the base of the resilient plate 13⁴ to enable proper positioning during attachment. The curled plate 13⁴ as shown in Figure 13 is positioned so that the flange 56 and the tang 65 will be in contact before insertion of the key 12⁴ (see Fig. 13).

It will be noted that the longitudinal inturned edge 57 of the license plate B⁴ closely fits onto the longitudinal edge of the bar 11⁴.

It will be noted that the opening 23⁴ is of key hole shape and has a central opening 72 and the extensions 59 which cooperate with the extended upper portions 52c of the resilient elements 52 to lock the key 21⁴ in position when it is inserted through the spring member 13⁴.

In operation, it will be noted that the key 12⁴ may be readily inserted through the opening 54, the slot 50 and the opening 23⁴ in the spring element 13⁴, the spring finger portions 52c being pressed into the slots 51 by the opening 72 as the key 21⁴ is inserted at an angle of 90° from its locking position. The end 22⁴ of the key 21⁴ is made of such size that it may be inserted through the slots 59.

When the key is turned 90° after it has been inserted through the plate B⁴, the bar 11⁴ and the spring member 13⁴, the portions 52c of the resilient members 52 will spring out and snap into the slot 59 of the key hole slot 23⁴.

When this occurs, the device will be locked into position and will not be removed nor will unauthorized people be able readily to remove the license from the automobile or vehicle when it is attached, as shown in Figure 17.

In Figures 15 and 16 is shown a tool for removing the license plates and unlocking the device, said tool consisting of a U-shaped member 60 with the side legs 61 and the inturned toes 62 provided with the recess 63 to fit onto the spring elements 52. These toes 62, when pressed against the spring members 52, as shown in Figure 16, will release the elements 52 from the slots 59 and permit the key 12⁴ to be turned and the plate B⁴ to be released.

However, without this tool 60, it will be particularly difficult to loosen the device and unlock the latch giving assurance that the license plates will not be removed by unauthorized persons without being damaged or broken.

The subject matter of the present application differs from that of the copending application, Serial No. 129,172, filed March 5, 1937, in that the plate of the present application has its side portions not only upturned but also inturned to engage the enlarged head 22 of the key which may be made integrally with the shank 21 of the key.

Furthermore, it will be noted that in the present application the locking means 52 is provided, cooperating with the slot 59 to hold the key locked in position.

It is apparent that the specific illustrations shown above have been given by way of illustration and not by way of limitation and that the structures above described are subject to wide variation and modification without departing from the scope or intent of the invention, all of which variations and modifications are to be included within the scope of the present invention.

What is claimed is:

1. In combination, two elements, one of said elements having an opening therein and the other carrying a rotatably mounted key member extending through said opening, and a resilient sheet metal plate means having two opposite sides, first curved upwardly and then curved inwardly to resiliently engage said key member, the intermediate portion of said plate means contacting the element having the opening.

2. The combination of claim 1 in which said key member has lateral projections at the end thereof and said opposite sides are recessed and receive said lateral projections in said recesses.

3. The combination of claim 1, in which said plate means has two end portions mounted in said last mentioned element.

4. The combination of claim 1, in which one of said elements consists of a license plate and the other element consists of a support for said license plate.

5. In combination, two elements connected together, one of said elements having an opening, a resilient latch, said latch comprising a key member rotatably mounted on one of said elements, and extending through said opening, and a resilient sheet metal plate means having two opposite sides turned upwardly and outwardly to resiliently engage said key, the intermediate portion of said plate means contacting the element having the opening and said key member and plate means being also provided with interlocking means to prevent turning of said key member from engaged position.

6. The combination of claim 5, said last mentioned means including spring wires on the key and recesses in the plate means to engage said spring wires.

JEREMIAH W. ALBIN.